July 2, 1963  A. W. GAUBATZ ETAL  3,095,695
CONVERGENT-DIVERGENT JET NOZZLE
Filed Nov. 23, 1959  5 Sheets-Sheet 1

INVENTORS
Arthur W. Gaubatz, &
BY James W. Moore

Robert E. McCollum
ATTORNEY

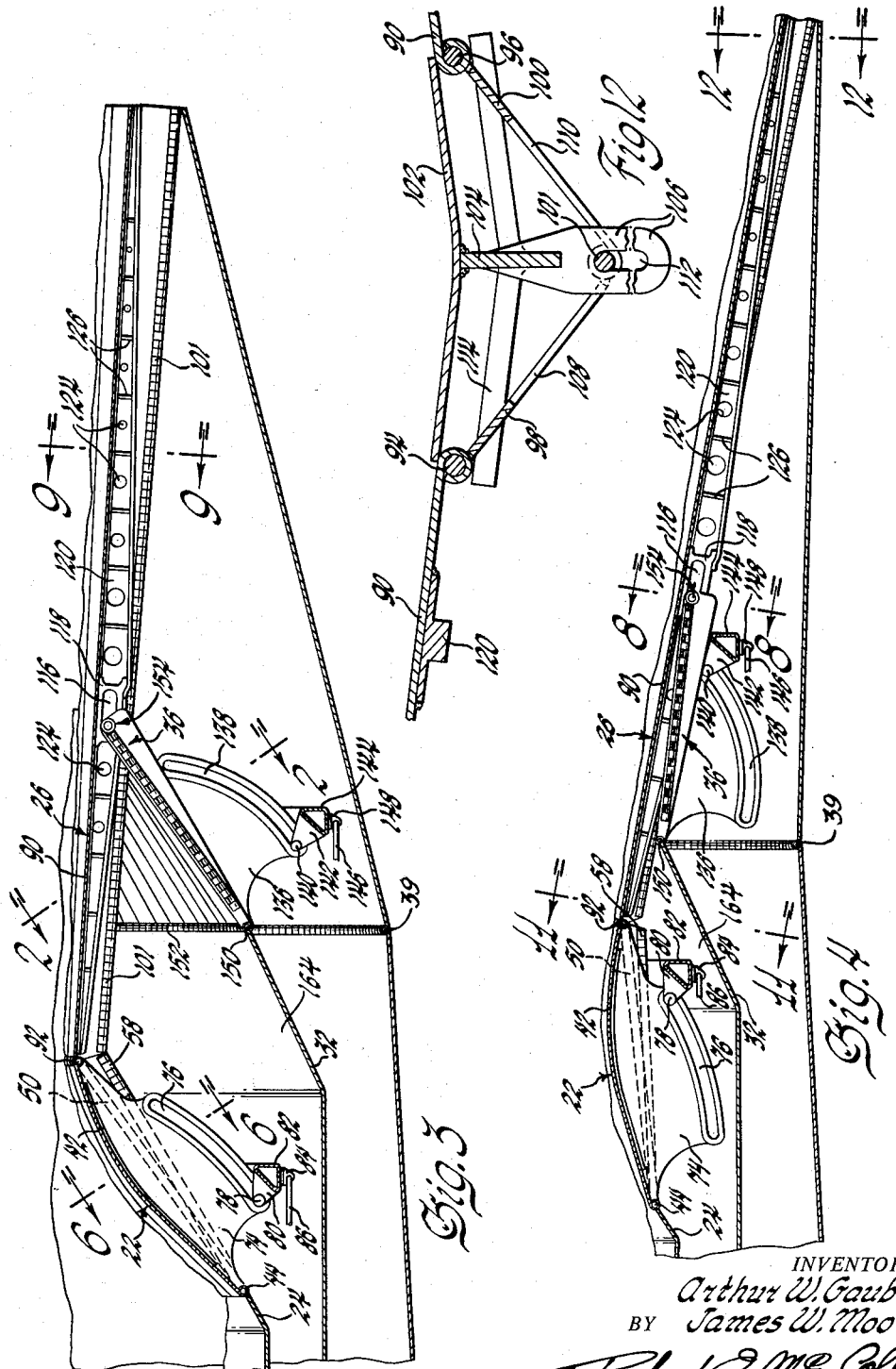

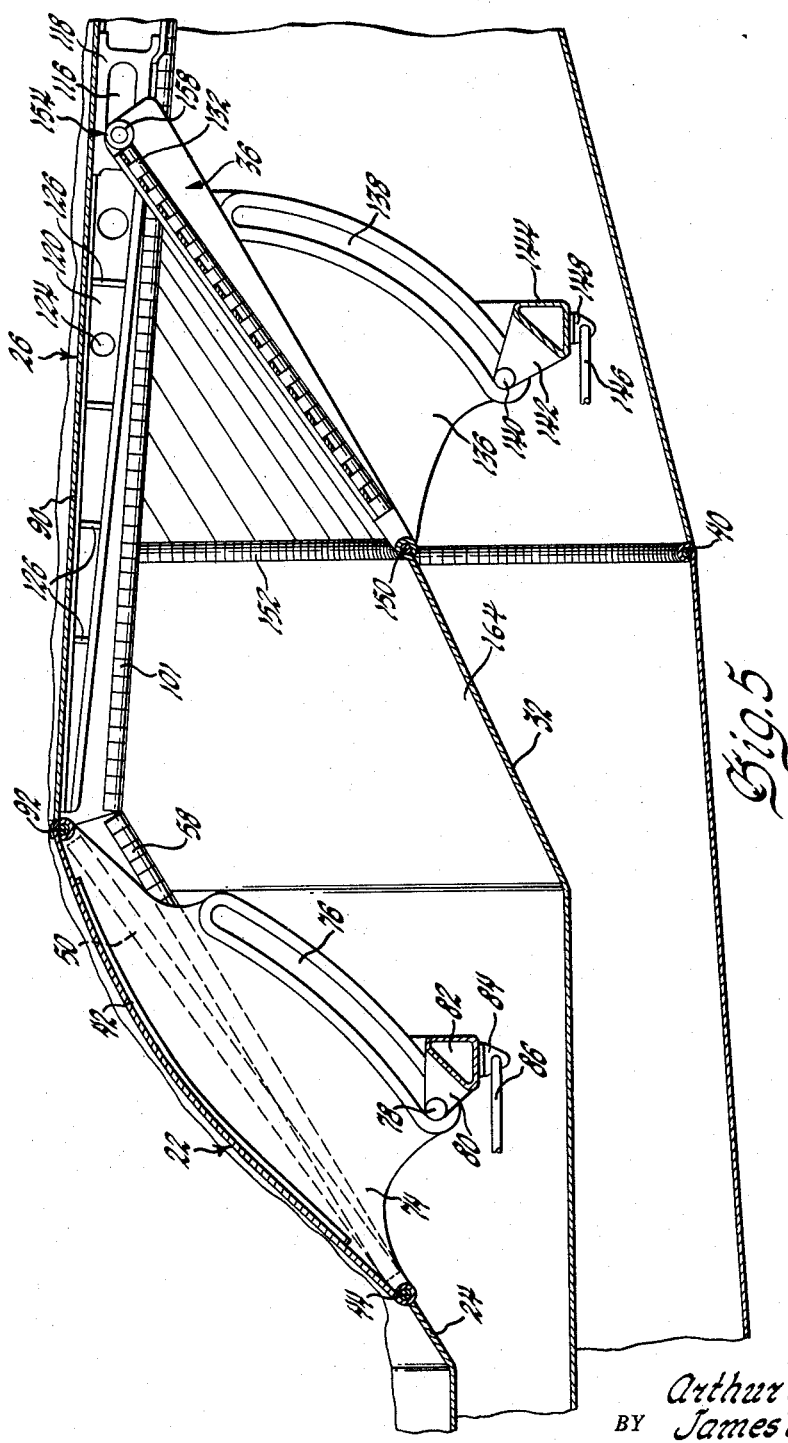

July 2, 1963  A. W. GAUBATZ ETAL  3,095,695
CONVERGENT-DIVERGENT JET NOZZLE
Filed Nov. 23, 1959  5 Sheets-Sheet 5
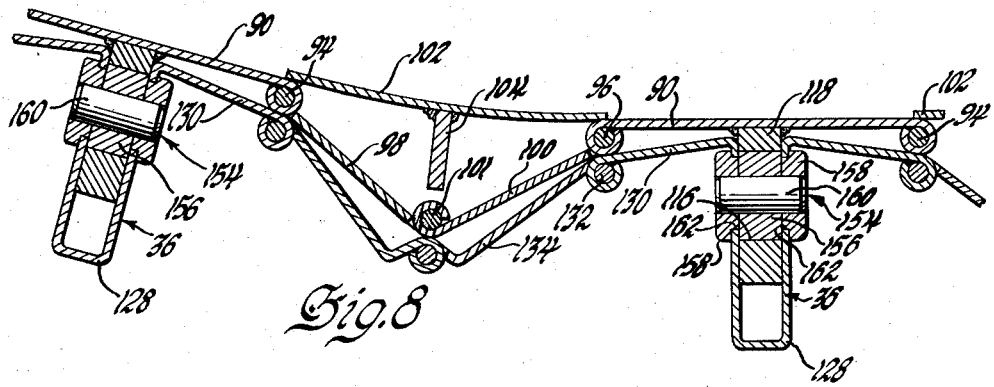
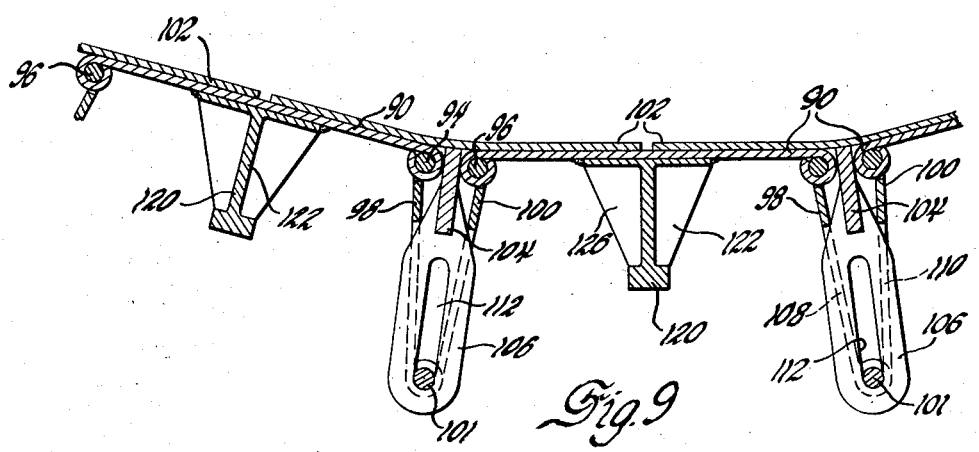
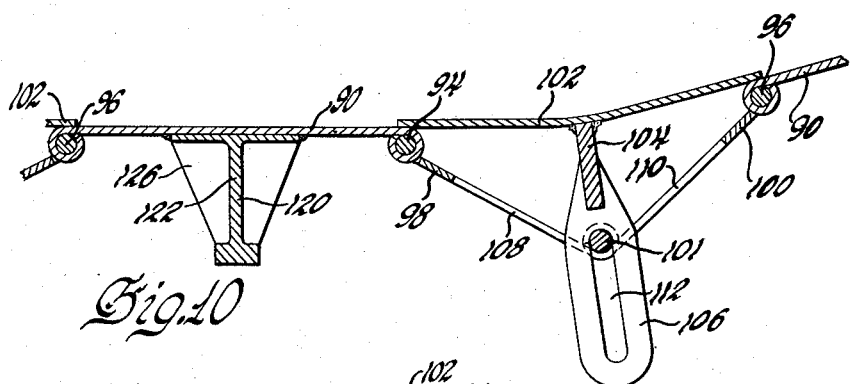
INVENTORS
Arthur W. Gaubatz, &
BY James W. Moore
Robert E. McCollum
ATTORNEY 3,095,695
CONVERGENT-DIVERGENT JET NOZZLE
Arthur W. Gaubatz, Indianapolis, and James W. Moore, West Lafayette, Ind., assignors to General Motors Corporation, Detroit, Mich., a corporation of Delaware
Filed Nov. 23, 1959, Ser. No. 854,968
3 Claims. (Cl. 60—35.6)

This invention relates to a convergent-divergent jet nozzle.

More particularly, this invention relates to a gas turbine engine having an exhaust nozzle comprising variable area convergent and divergent sections pivoted to each other to define a venturi and nozzle exit therein both adjustable substantially independently of each other providing the proper venturi and exit area for maximum recovery under all operating conditions. Also, means are provided acting against the exterior surface of the nozzle to substantially balance the outwardly acting gas forces within the nozzle, thereby largely balancing the forces tending to expand the venturi and reducing the force necessary to operate the nozzle adjusting mechanism to a low value.

Figure 1:
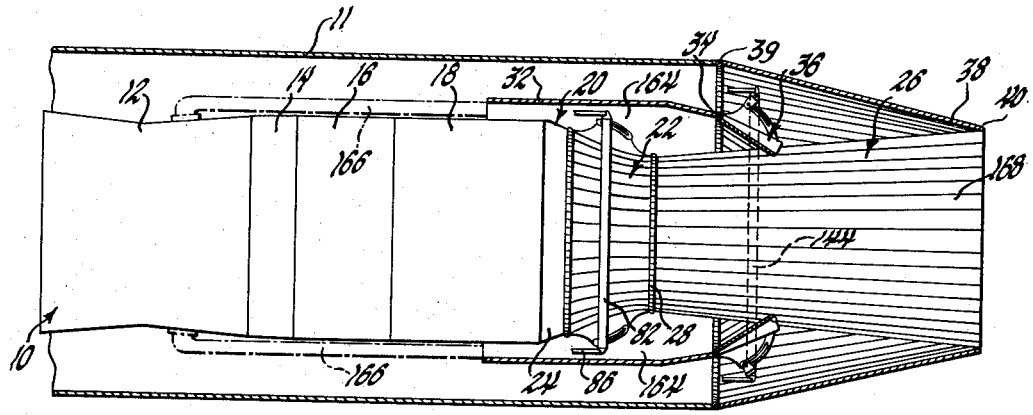
Figure 2:
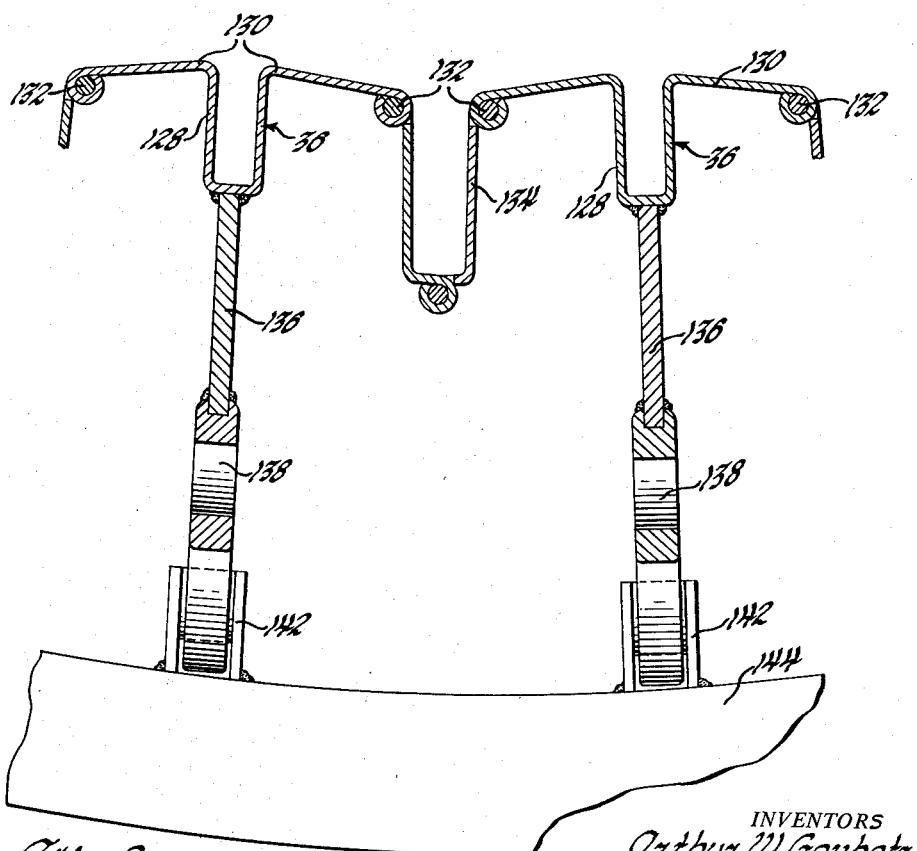
Figure 6:
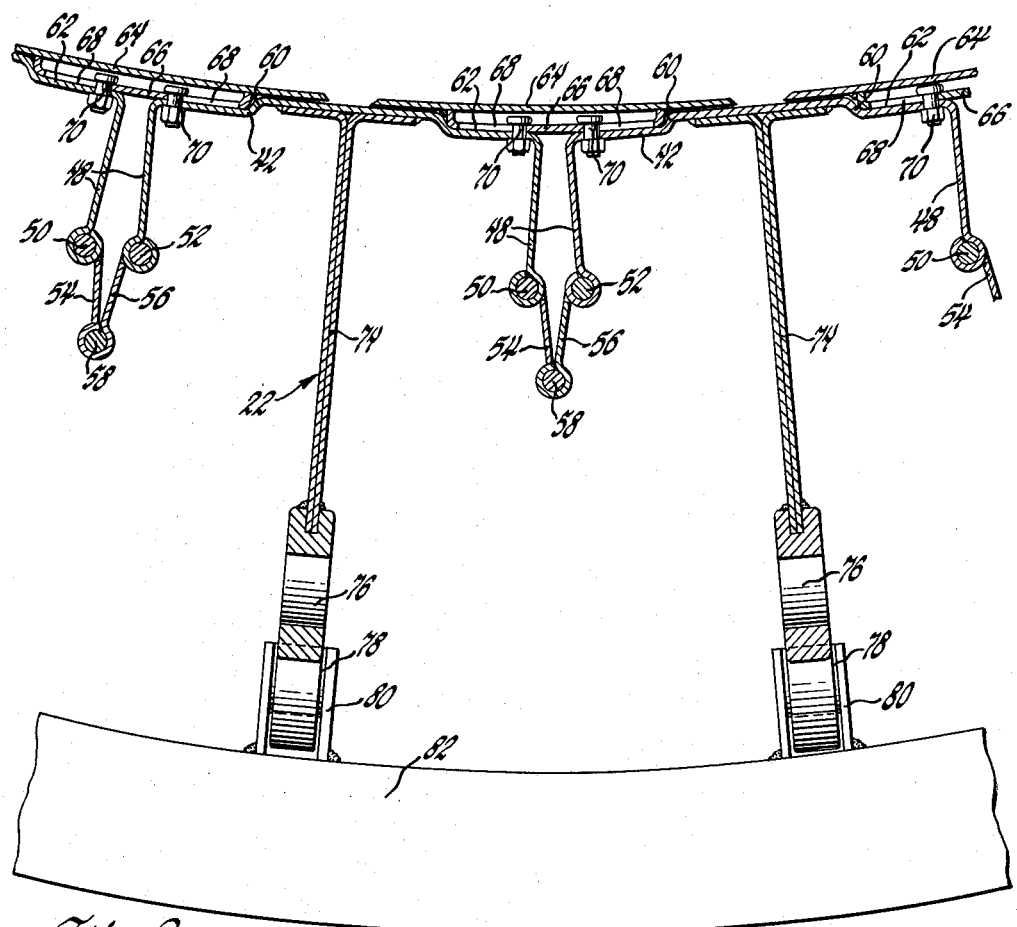
Figure 7:
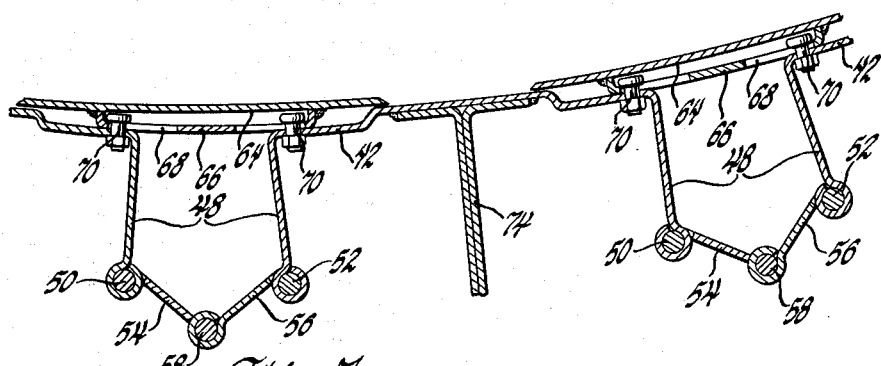

Other features, advantages and objects of the invention will become apparent by reference to the detailed description thereof and to the drawings illustrating the preferred embodiment of this invention, wherein, FIGURE 1 is a schematic representation of a gas turbine engine embodying this invention, FIGURE 2 is an enlarged cross-sectional view of a portion of the nozzle on a plane indicated by the line 2—2 in FIGURE 3, FIGURE 3 is an enlarged longitudinal sectional view of a portion of the nozzle of FIGURE 1 in one position of operation, FIGURE 4 is a view similar to FIGURE 3 showing the nozzle of FIGURE 3 in a different operative position, FIGURE 5 is an enlarged longitudinal section of a portion of the nozzle of FIGURE 3, FIGURE 6 is an enlarged cross-sectional view through a portion of the nozzle section on a plane indicated by the line 6—6 of FIGURE 3, FIGURE 7 is a partial view of the section of FIGURE 6 in extended or maximum area position, FIGURE 8 is an enlarged cross-sectional view through a portion of the nozzle on the plane indicated by the line 8—8 of FIGURE 4, FIGURE 9 is an enlarged cross-sectional view through a portion of the nozzle on a plane indicated by the line 9—9 of FIGURE 3, FIGURE 10 is a view of a portion of the FIGURE 9 section in extended or maximum area position, FIGURE 11 is an enlarged cross-sectional view of a plane indicated by the line 11—11 of FIGURE 4, and FIGURE 12 is an enlarged cross-sectional view on a plane indicated by the line 12—12 of FIGURE 4.

Referring to the drawings and more particularly to FIGURE 1, there is shown schematically therein an axial flow type gas turbine engine 10 secured in an aircraft engine nacelle 11 by means not shown, the engine 10 conventionally including a compressor section 12, a diffuser section 14, a combustion section 16, a turbine section 18 and an exhaust nozzle 20 constituting the subject matter of this invention. As shown, the exhaust nozzle comprises a variable area convergent nozzle section 22 pivoted at one end to a slightly converging portion 24 of the engine casing, and at its other end to a variable area divergent nozzle section 26, the pivotal connection between the two nozzle sections constituting a venturi or throat 28. Surrounding the convergent nozzle section and a portion of the divergent section is an annular hollow shroud or casing 32 pivotally connected at one edge 34 to a number of circumferentially arranged divergent section adjusting members 36 in turn pivotally and slideably connected to the divergent section 26, with its other edge extending forwardly over the engine as shown to form a chamber adapted to be pressurized in a manner to be described later. Pivotally attached at 39 to the downstream end of the nacelle 11 are a plurality of circumferentially arranged slightly overlapping boat-tail elements or segments 38 pivotally and slidably connected at their ends 40 to the ends of the nozzle exit portions so as to be radially movable therewith.

The details of the boat-tail fairing elements 38 and their connections at 39 to the nacelle and at 40 to the divergent nozzle section 26 are immaterial to our invention. As will be apparent from U.S. Patents 2,780,056 and 3,004,385, the connection at 39 may be a simple hinge and that at 40 a slip hinge, providing for limited relative axial movement.

Other details of the gas turbine engine beyond those already described except as to the nozzle and shroud are known and immaterial to an understanding of the present invention, and therefore are not described.

As shown more particularly in FIGURES 5, 6 and 7, the convergent nozzle section 22 comprises a plurality of circumferentially arranged longitudinally extending arcuate flaps 42 each pivotally connected by a hinge 44 to the converging end 24 of the engine casing, the flaps having a longitudinal converging taper from the fixed end 24 to the throat 28. Each of the flaps 42 has longitudinally extending radially tapering flanges 48 pivotally connected by longitudinally extending piano-type hinges 50 and 52 to longitudinally extending hinged leaves 54 and 56 in turn pivoted to each other by another piano-type hinge 58, the leaves 54 and 56 having a longitudinally diverging taper from the fixed end 24 to the throat 28. Thus, the hinged connections permit circumferential separation of the flaps 42 from the FIGURE 6 position by radial movement of the hinge 58 upon the pivotal movement of the flaps 42 about the hinge 44 to arcuately swing the leaves 54 and 56 to the position shown in FIGURE 7.

Because of the possibility of a turbulent effect being imposed on the gas in the gap between flaps, filler strips are provided for bridging the gaps to provide a substantially continuous fairing around the inner circumference of the convergent section for the smooth streamlined flow of exhaust gases therethrough, thereby minimizing the drag and other friction effects of the duct on the exhaust gases. As seen in FIGURES 6 and 7, adjacent portions of each of the flaps 42 are rolled at 60 to provide a recess 62 into which is slidably nested a longitudinally extending filler strip 64 constituting a thin metallic plate of an arcuate shape corresponding to the curvature of the convergent section. Welded or otherwise secured to the underside of the filler strip is a longitudinally extending attaching section 66 of U-shaped cross-section slotted at 68 for slidable cooperation with a plurality of bolt and nut combinations 70 secured to each of the flap segments 42 as shown. Circumferential separation of the flap segments 42 with respect to each other therefore causes circumferential movement of the bolts 70 in the slots 68 to maintain the gap spanned as shown in FIGURE 7.

The means for actuating the flaps 42 to vary the nozzle area comprises a cam plate 74 of T-shaped cross-section welded or otherwise secured to the central outer portion of each of the flaps 42 as shown in FIGURES 6 and 7. Each of the cam plates 74 has an arcuate cam slot 76 provided therein for cooperation with a cam means or pin 78 secured by a bracket 80 to an operating ring 82 of triangular form as seen in FIGURE 5 extending around the entire circumference of the convergent section. Secured to the ring at different positions around the circumference thereof by depending flange portions 84 are a number of operating rods 86 adapted to be connected to hydraulically operated pistons or other suitable means (not shown) for axially moving the ring 82.

Referring to FIGURES 2–5, and 8–12, the divergent nozzle section 26 comprises a number of circumferentially arranged longitudinally extending sheet metal flaps 90 each pivotally connected at its upstream edge by a piano-type hinge 92 to a flap 42 of the convergent nozzle portion for pivotal movement with respect thereto. The flaps 90 are each connected at adjacent edges by piano-type hinges 94 and 96 to longitudinally extending leaves 98 and 100 hinged to each other at 101 as seen in FIGURE 8, both the flaps and leaves having a longitudinally diverging taper between the pivot 92 and the nozzle exit as seen in FIGURES 11 and 12. Thus, each of the flaps 90 can be circumferentially separated from the other flaps by a radial movement of the piano-type hinge 101 to vary the internal area of the divergent nozzle section 26.

As in connection with the convergent section flaps 42, filler strips are provided for bridging the gap between adjacent divergent flaps to minimize gas losses and reduce drag, etc. As shown in FIGURES 8–12, longitudinally extending arcuately shaped sheet metal filler strips or plates 102 are provided between each of the flaps 90 extending circumferentially to overlap the adjacent portions of the flaps 90 and providing a lateral sliding relative movement thereupon. Secured to the outer radial central portion of each of the filler strips is a radially tapering stiffener 104 extending for the entire length of the strip and having secured thereto by welding or the like at suitable locations along the length thereof a number of radially extending filler strip centering members or brackets 106 extending through suitable slots 108 and 110 in the leaves 98 and 100 and being slotted at 112 for the insertion therethrough of the hinge 101. The slot 112 thus serves as a track for the radial sliding movement of the hinge 101 upon circumferential separation of the flap leaves 98 and 100. Also welded or otherwise secured to the filler strip stiffener at longitudinal positions staggered from the bracket member positions are a number of arcuately shaped guide bar members 114, as seen in FIGURES 11 and 12, extending circumferentially through appropriate openings in the leaves 98 and 100 for approximately the same distance as the filler strips so that the guide bars in combination with the filler strip straddle the hinges 94 and 96 to maintain the filler strips in close sliding engagement with the flaps 90 at all times. Therefore, it will be clear that the filler strips, which have a longitudinal diverging taper between the FIGURES 11 and 12 sections, will slide upon the flaps 90 upon circumferential separation thereof to always bridge any gap therebetween as shown in FIGURES 9 and 10. Although not shown, the filler strips are also slightly extended at their end adjacent the hinge 92 so as to overlap the hinge 92 and a small portion of the convergent section filler strips 64 to prevent loss of gas or entrance of air, as the case may be, through the longitudinal space between hinges 58 and 101.

Each of the flaps 90 is adapted to be rotated about its pivot 92 by the actuating member 36 having one end rotatably mounted and slidably engaged in a longitudinally extending slot 116 in a pivot plate 118 fixed to the outer surface of each of the flaps 90. As seen in FIGURES 3 and 8, pivot plate 118 is rectangular in cross-section and has longitudinally tapering reinforcing members 120 extending from each end thereof to the pivot 92 and the nozzle exit portion, respectively, each of the members tapering gradually from a T-shaped cross-section at the connection to the pivot plate as seen in the FIGURE 9 section to the hat-shaped cross-section at the venturi and nozzle exit as shown in the FIGURES 11 and 12 sections, respectively, the tapering being effected by a gradual reduction in the radial height of the connecting web portion 122. Each of the members 120 is welded or otherwise fixed to the outer surface of a flap 90 in the same manner as pivot plate 118, and are provided with lightening holes 124 and laterally extending reinforcing ribs 126 at suitably spaced intervals as shown in FIGURES 9 and 10.

As best seen in FIGURES 2 and 8, each of the actuating members 36 comprises a substantially U-shaped actuating arm 128 tapering longitudinally from a maximum depth at the point of connection with the pivot plate 118 to a minimum at its opposite end, and of a thickness slightly greater than the thickness of the pivot plate 118 to receive the plate therein as shown in FIGURE 8, and at times portions of the reinforcing members 120 when the flaps 90 are adjusted to their maximum open position shown in FIGURE 4.

Each of the sides of the actuating arm has laterally extending flanges 130 hinged at their edges 132 to hinged leaves 134 in a manner similar to the hinged leaved connections between the flaps 90. Welded to each of the arms and extending radially therefrom is a cam plate 136 having an arcuate cam slot 138 cooperating with a pin 140 secured by a plate 142 to a triangular-shaped operating ring 144 extending circumferentially around the divergent nozzle section as shown in FIGURE 1, and adapted to be actuated axially by hydraulic pistons or other suitable means (not shown) axially moving a number of circumferentially located rods 146 (only one shown) secured by brackets 148 to the ring 144.

Each of the arms 128 is pivoted at its upstream edge 150 to the annular shroud or casing 32 by a circumferentially extending hinge 152, while at its other end, the arms are pivoted to pivot plate 118 by a roller assembly 154. The roller assembly 154 comprises a roller 156 slidably and rotatably mounted in the slot 116 of pivot plate 118 and held from lateral displacement by the abutment on each side thereof of buttons 158 secured to each other by a pin 160 extending through the roller, the buttons 158 being mounted in axially aligned holes 162 in the end of the actuating arm. The assembly is such that upon sufficient straddling of the outer portion of the pivot plate by the arm to align the holes 162 and slot 116, the pin 160 can be inserted through the roller 156, and the buttons secured thereon to pivotally connect the arm to the pivot plate for a rolling movement in the slot 116.

From the detailed description given, and by referring to FIGURES 1–5 and 8, it will be seen that the pivotal connection of the arms 128 to each other and to the flaps 90 and casing 32 forms a chamber 164 that, as will be described, is adapted to be pressurized by ram air or compressor discharge air.

In the passage of the exhaust gases through the convergent and divergent sections, the venturi or throat 28 is subjected to forces thereon tending to increase or expand the area at this point by circumferentially separating the flaps, these forces increasing with an increase in the flight speed. In an unbalanced nozzle, these forces are practically unopposed, and the magnitude of the forces required to actuate the flaps against the gas pressure might amount to 1,500,000 pounds of force, for example, which makes it virtually impossible to operate the actuating mechanism satisfactorily. Since the portion of the C—D nozzle between the inlet end of the convergent section and the hinged connection 92 to the divergent section is subjected to the greatest pressure gradient, and since the internal pressure therein increases with an increase in the ram air pressure in the inlet to the engine whereas the ambient pressure on the outside of the nozzle does not, pressurizing the interior of the shroud 32, i.e., chamber 164, with ram air, and, of course, properly selecting the locations of the pivot points, will largely balance the internal forces acting to expand the throat to reduce the force necessary to actuate the nozzle to a low value. The linkage of course will be designed as a compromise between conditions when there is substantially no internal load, such as in starting or at low speeds when balancing isn't needed much, as well as under the worst conditions when the engine is at high Mach numbers flight speeds, for instance. Thus, the forces necessary to actuate the nozzle sections are effectively reduced from 1,500,000 pounds of force to a force of only 80,000 pounds, for example, by the use of ram air in compartment 164.

As shown in FIGURE 1, the chamber 164 formed by shroud 32 is open at its upstream end so as to be pressurized by ram air under flight conditions. However, as shown in dotted lines, chamber 164 could alternately be pressurized by compressor discharge air supplied thereto through a series of circumferentially spaced air conduits 166 secured to the compressor discharge section, for example, the pressure of which also varies with a change in Mach number flight speeds so as to follow the rise in the nozzle throat pressure. Also, compressor discharge pressure would be higher than ram inlet air pressure and more closely approximate the exhaust gas pressures. While compressor discharge air has been described as an alternate pressurizing medium, it is to be understood though that the pressure could be obtained from any stage of the compressor and the particular stage chosen would be that one or more that provided the best balance against the exhaust gas pressure for the particular design flight conditions. Balancing is accomplished, therefore, by either the use of ram air or compressor air in compartment 164.

It is to be noted in connection with the shape of the nozzle, that the particular hour-glass configuration of the convergent and divergent nozzle sections shown is chosen to provide a venturi of correct shape to induce smooth flow with minimum shock in the converging section, throat, diverging section and at the outlet end. The detailed design of the venturi or throat is attained by suitable calculations to satisfy known laws of fluid flow which have been determined theoretically and by suitable experiments. The shape has been chosen to be correct for the entire range of engine operation and flight conditions providing a smooth correctly shaped passage as a result of the arrangement of the hinged segments or flaps together with the filler guide strips.

While no particular number of flap segments has been recited, thirty flap segments, for example, could be used in each of the convergent and divergent sections to constitute said sections.

Referring to the operation of the nozzle as a whole, FIGURES 3 and 4 illustrate the nozzle in its two extreme positions, i.e., minimum area (closed) and maximum area (open) positions, respectively. With the sections positioned as in FIGURE 3, actuation of ring 82 either individually or simultaneously with the ring 144 moves the convergent and divergent section follower pins 78 and 140, respectively, axially downstream of the engine to move the actuating plates 74 and 136 radially outwardly about the hinger pivot 44, thereby moving the hinged leaves 54, 56, 98 and 100 radially to circumferentially separate the flaps from each other while increasing the area enclosed by the flaps 42 and 90 and filler strips 64 and 102 and causing the exhaust gas flow to more closely approach a straight unrestricted path as seen in FIGURE 4. Each of the rings 82 or 144 can be actuated individually to substantially independently vary the area of the venturi or throat 28 or the nozzle exit 168 because of the particular location of the pivotal connections 44, 92, 150 and 154 connecting the convergent and divergent sections to each other and to casing 32.

From the foregoing it will be seen that this invention provides a convergent-divergent jet nozzle providing substantially individual adjustment of either of the convergent or divergent sections to vary the internal area of the venturi or throat and the nozzle exit portion thereof. Furthermore, this invention provides a means for balancing the pressures of the exhaust gases passing through the nozzle permitting the selective actuation of the different portions of the nozzle without undue influence from the said exhaust gas forces, thus providing a light, easily maneuverable and efficiently operating variable area exhaust nozzle.

While the invention has been illustrated in its preferred embodiment in FIGURES 1 to 12, it will be clear to those skilled in the art that many modifications can be made thereto without departing from the scope of the invention.

We claim:

1. A convergent-divergent jet nozzle for an aircraft type gas turbine engine having an exhaust duct with an outlet for the passage of exhaust gases therethrough, said nozzle comprising annular convergent and divergent sections axially aligned with said outlet and each other and pivotally connected to each other at their adjacent ends, the opposite end of said convergent section being pivotally connected to said duct, the pivotal connection between the convergent and divergent sections constituting a throat, each of said sections comprising a plurality of circumferentially spaced flaps operatively pivotally connected to each other at their adjacent lateral edges to form a continuous annular surface, the pivotal connection between said flaps comprising means both radially and circumferentially movable permitting increase or decrease in the area enclosed by said flaps, the movement of said pivotal connection varying the area of said throat, cam follower means secured to each of said flaps, said cam follower means having an arcuate slot therein, annular shroud means having a plurality of pins thereon engageable in each of said slots, said shroud means being axially movable to radially vary the position of said flaps, and means for moving said shroud means to vary the area of said throat, the passage of the exhaust gases through said throat exerting forces on said throat tending to increase its area, air conduit means secured at one end to said divergent section and surrounding portions of the same and the convergent section to define an air compartment therebetween, the opposite end of said conduit means being in communication with ram air upon forward flight of said aircraft, said ram air acting in said compartment against the exterior of said sections in a direction balancing the forces of the said exhaust gases permitting the axial movement of said shroud means to selectively vary the area of said throat.

2. A convergent-divergent jet nozzle for an aircraft type gas turbine engine having a compressor section, a combustion section, a turbine section and an outlet duct for the flow of fluid therethrough comprising, axially aligned convergent and divergent tubular sections pivoted to each other at their adjacent ends, means pivotally connecting the opposite end of said convergent section to said duct, each of said sections being circumferentially expandable or contractable to vary the area of said sections and the throat at the connection between said sections, said sections each comprising a plurality of circumferentially arranged flaps pivoted to each other at their adjacent lateral edges, the pivotal connection between said edges having a combined radial and axial movement selectively circumferentially expanding or contracting the area of said sections by the radial movement of said flaps, a cam plate secured to each of said flaps having an arcuate cam slot therein, each of said sections having axially movable cam means engageable in each of said slots for simultaneously actuating each of said flaps in a radial direction to vary the area of said sections and said throat, annular operating means secured to each of said cam means for axially moving said cam means, means between and slidably engaging each of the flaps of said convergent section bridging any gap between said flaps providing a smooth streamline interior to said convergent section, said divergent section having longitudinally extending strut means secured thereto having slot means therein, means pivotally connecting the cam plates of said divergent flaps to said strut means through said slot means, a tubular hollow casing pivotally secured at one end to said divergent cam plates and extending forward of said engine to surround said convergent section, means connecting the forward end of said casing to the fluid discharge portion of said compressor section, portions of said divergent section and said convergent section together with said casing forming an air compartment therebetween subject to the effect of compressor discharge fluid therein, the passage of exhaust gases through said throat exerting forces thereon tending to increase the area of said throat, the compressor discharge fluid acting against the exterior of said throat substantially balancing the effect of said exhaust gas forces permitting the selective variation of area of the throat by the selective movement of the axially movable means.

3. An exhaust nozzle for the duct of an aircraft type turbo-machine comprising axially aligned annular convergent and divergent nozzle sections pivotally connected to each other at their abutting ends, means pivotally connecting the opposite end of said convergent section to said duct, said sections being radially expandable or contractable to vary the area within said sections, each of said sections comprising a plurality of flaps arranged in side by side relation around the longitudinal axis of the sections to form a continuous annular-like surface, said flaps being operatively pivotally joined to each other at their circumferential edges, said flaps and the pivotal connection therebetween being radially movable to vary the area of said sections, movable cam track means secured to each of said flaps for radially moving said flaps, annular axially movable cam means simultaneously engaging each of said cam track means, movement of said cam means radially moving said flaps to vary the area of said sections, the connection of said sections to each other constituting a variable area throat, an annular longitudinally extending casing operatively secured at one end to said divergent section closing said end and defining an air chamber between said casing and sections and duct, the other end of said casing being open and subject to the flow of ram air thereinto upon forward flight motion of said aircraft, said throat area being increased in response to the forces of the exhaust gases passing therethrough acting on said sections, the forces of said ram air in said compartment on the exterior of said sections opposing and balancing said first mentioned forces permitting the movement of said cam means to selectively vary the area of said throat.

References Cited in the file of this patent

UNITED STATES PATENTS

| | | |
|---|---|---|
| 2,439,473 | Kalitinsky | Apr. 13, 1948 |
| 2,780,056 | Colley | Feb. 5, 1957 |
| 2,840,984 | Laucher | July 1, 1958 |
| 2,914,914 | Vandenberg | Dec. 1, 1959 |
| 2,923,127 | Biehl et al. | Feb. 2, 1960 |
| 2,926,491 | Hyde | Mar. 1, 1960 |
| 2,931,169 | Glenn | Apr. 5, 1960 |
| 2,989,845 | Howald | June 27, 1961 |
| 3,004,385 | Spears et al. | Oct. 17, 1961 |

FOREIGN PATENTS

| | | |
|---|---|---|
| 220,504 | Australia | Mar. 4, 1959 |